(12) United States Patent
Ruan

(10) Patent No.: US 12,059,314 B1
(45) Date of Patent: Aug. 13, 2024

(54) ELECTRIC TOOTHBRUSH CONNECTOR AND ELECTRIC TOOTHBRUSH

(71) Applicant: Xiaofeng Ruan, Jiangxi (CN)

(72) Inventor: Xiaofeng Ruan, Jiangxi (CN)

( * ) Notice: Subject to any disclaimer, the term of this patent is extended or adjusted under 35 U.S.C. 154(b) by 0 days.

(21) Appl. No.: 18/539,049

(22) Filed: Dec. 13, 2023

(51) Int. Cl.
*A61C 17/34* (2006.01)
*A46B 5/00* (2006.01)
*A61C 17/22* (2006.01)

(52) U.S. Cl.
CPC ........ *A61C 17/3481* (2013.01); *A46B 5/0095* (2013.01); *A61C 17/222* (2013.01)

(58) Field of Classification Search
CPC ....... A46B 5/0095; A46B 7/04; A61C 17/222; A61C 17/225
See application file for complete search history.

(56) References Cited

U.S. PATENT DOCUMENTS

| | | | |
|---|---|---|---|
| 11,903,782 B1* | 2/2024 | Ruan | A61C 17/222 |
| 2010/0101032 A1* | 4/2010 | Kressner | A61C 17/22 15/22.1 |
| 2022/0168082 A1* | 6/2022 | Hu | A61C 17/221 |
| 2023/0338126 A1* | 10/2023 | Zhou | A46B 5/0095 |

\* cited by examiner

*Primary Examiner* — Eric J Rosen
*Assistant Examiner* — Aaron R McConnell

(57) ABSTRACT

An electric toothbrush connector (100) includes a connector body (10), a pressing module (20) and an elastic member (30). A pressing block groove (101) is disposed in the connector body (10). The pressing module (20) is located in the pressing block groove (101). The elastic member (30) is connected to the connector body (10), and the pressing module (20) is pressed against the pressing block groove (101).

18 Claims, 5 Drawing Sheets

ELECTRIC TOOTHBRUSH CONNECTOR AND ELECTRIC TOOTHBRUSH

TECHNICAL FIELD

The present disclosure relates to the field of electric toothbrushes, in particular, to an electric toothbrush connector and an electric toothbrush.

BACKGROUND

In daily life, an automatic cleaning care apparatus is increasingly widely used, and an electric toothbrush can be more conveniently and effectively cleaned. The electric toothbrush usually uses high-speed vibration to clean the teeth, and has different vibration modes and strengths. Currently, the electric toothbrush on the market mainly uses the following vibration modes: Rotary vibration, acoustic vibration, and ultrasonic vibration.

Most of the electric toothbrushes may be divided into a replaceable toothbrush head and a driving handle. Most existing electric toothbrushes implement high-frequency vibration of the toothbrush head by transmitting a mechanical motion on the driving handle to the toothbrush head, thereby achieving an effect of cleaning the teeth. When the electric toothbrush vibrates at a high frequency, a problem that noise occurs in a process of mechanical motion transmission of a driving handle of the electric toothbrush.

SUMMARY

To overcome a disadvantage of the prior art, the present disclosure provides an electric toothbrush connector and an electric toothbrush, so as to resolve a problem that noise is relatively high in a use process of an existing electric toothbrush.

A technical solution used by the present disclosure to solve a technical problem of the present disclosure is as follows.

An electric toothbrush connector includes a connector body, wherein a pressing block groove is disposed in the connector body; a pressing module, wherein the pressing module is located in a pressing block groove; an elastic member, wherein the elastic member is connected to the connector body, and the pressing module is pressed against the pressing block groove.

In an improvement of the present disclosure, the connector body is provided with a first cavity, a first through hole is provided on the pressing block groove, the first through hole is communicated with the first cavity, and the first through hole separates the pressing block groove into a first limit groove and a second limit groove.

In an improvement of the present disclosure, the pressing module includes a first supporting block, a second supporting block, and a pressing block, and the elastic member presses the first supporting block against the first limiting slot and the second supporting block against the second limiting slot such that the pressing module is located in the first through hole.

In an improvement of the present disclosure, the elastic member is a torsion spring, the elastic member includes a U-shaped sleeve rod, a first coil spring and a second coil spring respectively connected to two ends of the U-shaped sleeve rod, and a first top rod and a second top rod respectively connected to the first coil spring and the second coil spring, wherein the first coil spring is provided with a first tube hole, and the second coil spring is provided with a second tube hole.

In an improvement of the present disclosure, the pressing module is provided with a second through hole, the U-shaped sleeve rod is clamped into the second through hole and disposed in the pressing block, one outer side wall of the connector body is provided with a first protrusion, the connector body is provided with a second protrusion on an outer side of a side wall opposite to the first protrusion, the connector body is further provided with a limiting wall and a limiting groove, the first tube rod is disposed in the first protrusion, the second tube rod is disposed in the second protrusion, and a second spring is disposed in the second protrusion, and the connector body is located in the limiting wall and the limiting groove, under the controls of a torsion spring force, a first jacking rod and a second jacking rod are pressed against the limit wall and the limit groove, and the U-shaped sleeve rod presses the pressing module in the pressing block groove.

In an improvement of the present disclosure, both the first protrusion and the second protrusion are cylindrical protrusions.

In an improvement of the present disclosure, the connector body further includes an annular buckle, and a portion of the annular buckle is disposed on an outer wall at a bottom of the connector body.

In an improvement of the present disclosure, the connector body further includes a guiding rib protruding out of an outer wall of the pressing block groove and is connected to the annular buckle.

In an improvement of the present disclosure, a guiding groove is provided on an outer wall of a top of the connector body, and the guiding groove is in communication with the pressing block groove and the limit groove.

An electric toothbrush includes a toothbrush head; an electric toothbrush connector, wherein the electric toothbrush connector includes a connector body, a pressing module, and an elastic member, the connector body is provided with a pressing block groove, the pressing module is located in the pressing block groove, the elastic member is connected to the connector body, and the pressing block is pressed against the pressing block groove; a handle, wherein the handle includes a handle body and an electric head, the electric toothbrush connector is configured to connect the toothbrush head to the handle, the toothbrush head is disposed on the electric toothbrush connector, and the electric head is disposed inside the electric toothbrush connector.

In an improvement of the present disclosure, the connector body is provided with a first cavity, a first through hole is provided on the pressing block groove, the first through hole is communicated with the first cavity, and the first through hole separates the pressing block groove into a first limit groove and a second limit groove.

In an improvement of the present disclosure, the pressing module includes a first supporting block, a second supporting block, and a pressing block, and the elastic member presses the first supporting block against the first limiting slot and the second supporting block against the second limiting slot such that the pressing block is located in the first through hole.

In an improvement of the present disclosure, when the electric head penetrates inside the electric toothbrush connector, the electric head is located within the first cavity, because the first through hole is in communication with the first cavity, and the pressing block is located within the first through hole, the pressing block is in contact with the electric head under an elastic force of the elastic member and the pressing block and the electric head compresses each other.

In an improvement of the present disclosure, the elastic member is a torsion spring, the elastic member includes a U-shaped sleeve rod, a first coil spring and a second coil spring respectively connected to two ends of the U-shaped sleeve rod, and a first top rod and a second top rod are respectively connected to the first coil spring and the second coil spring, the first coil spring is provided with a first tube hole, and the second coil spring is provided with a second tube hole.

In an improvement of the present disclosure, the pressing block is provided with a second through hole, the U-shaped sleeve is configured to be clamped into the second through hole and disposed in the pressing block, one outer side wall of the connector body is provided with a first protrusion, the connector body is provided with a second protrusion, the connector body is further provided with a limiting wall and a limiting slot, a first tube hole is provided in the first protrusion, and the second tube hole is provided in the second protrusion; under the controls of a torsion spring force, a first jacking rod and a second jacking rod are pressed against the limit wall and the limit groove, and the U-shaped sleeve rod presses the pressing module in the pressing block groove.

In an improvement of the present disclosure, the connector body further includes an annular buckle, and a portion of the annular buckle is disposed on an outer wall at a bottom of the connector body.

In an improvement of the present disclosure, the connector body further includes a guiding rib protruding out of the outer wall of the pressing block groove and is connected to the annular buckle.

In an improvement of the present disclosure, a guiding groove is provided on an outer wall of the top of the connector body, and the guiding groove is in communication with the pressing groove and the limit groove.

In an improvement of the present disclosure, the toothbrush head is provided with a second cavity having a opening, the electric toothbrush connector and the electric head are disposed within the second cavity, and the handle body abuts against the first cavity and the opening of the second cavity.

In an improvement of the present disclosure, the toothbrush head includes a head and a toothbrush rod disposed on a head of the toothbrush rod.

The beneficial effect of the present disclosure is that: according to above structure, by means of the elastic member, an anti-torsional force acts to enhance a force of elastic adjustment of a pressing module and tight force of a handle, so as to effectively transfer mechanical vibration energy of the driving handle to the toothbrush head more effectively and reduce noise. The elastic member and the pressing module may further reduce a case in which wear of a connector body and a handle is caused because high-frequency vibration is generated by using the electric toothbrush for a long time, thereby improving a service life and cleaning effect of the electric toothbrush.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
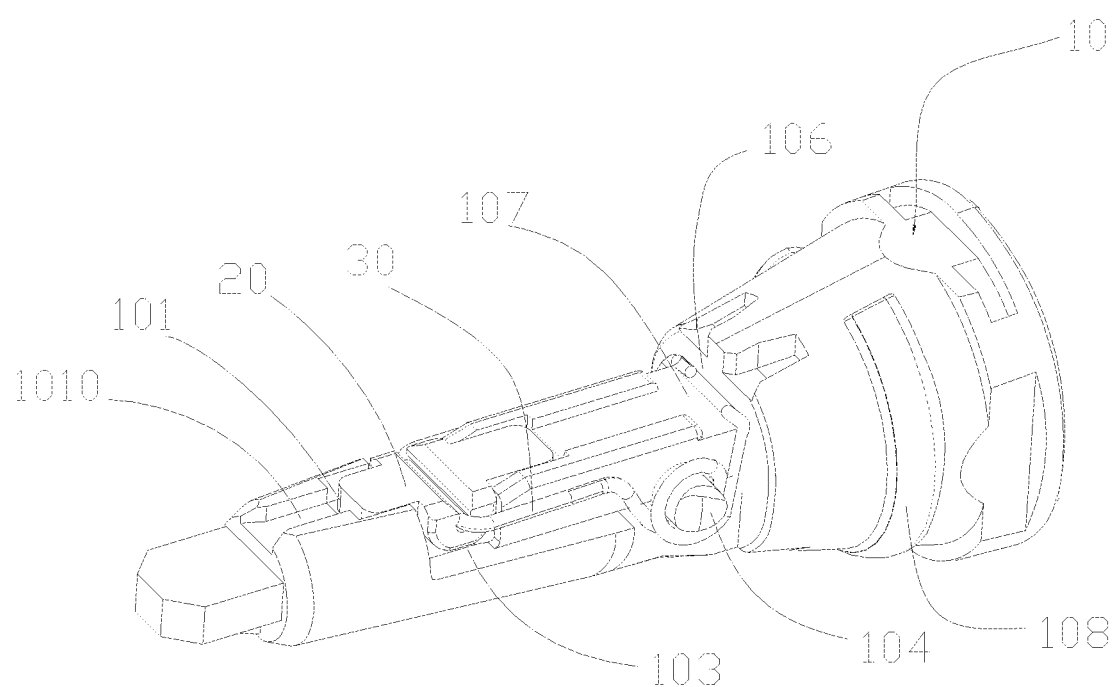
FIG. 1 is a schematic structural diagram of an overall structure of an electrical toothbrush connector of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
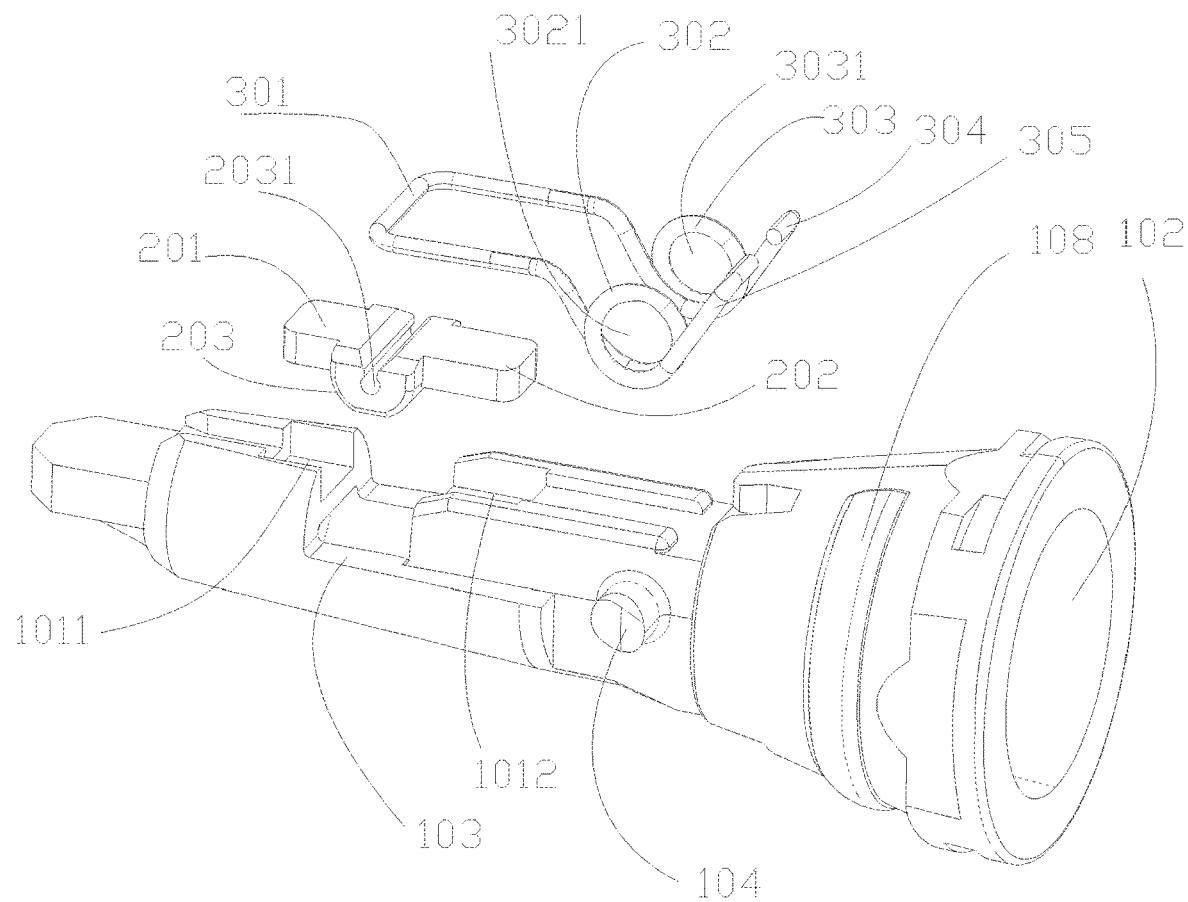
FIG. 2 is an explosion diagram of the electric toothbrush connector of the present disclosure.
Figure 3:
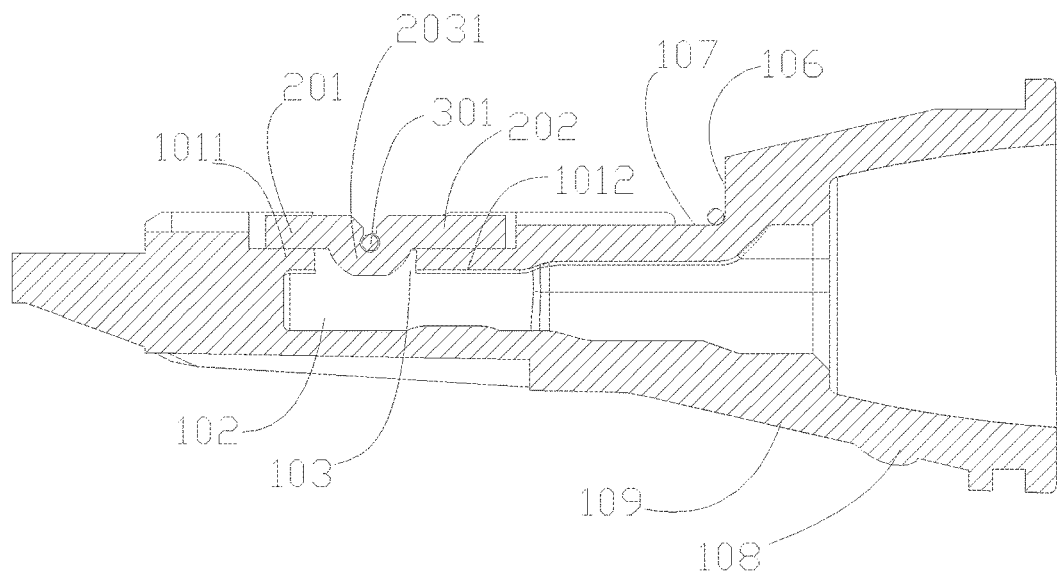
FIG. 3 is a cross-sectional view of the electric toothbrush connector of the present disclosure.
Figure 4:
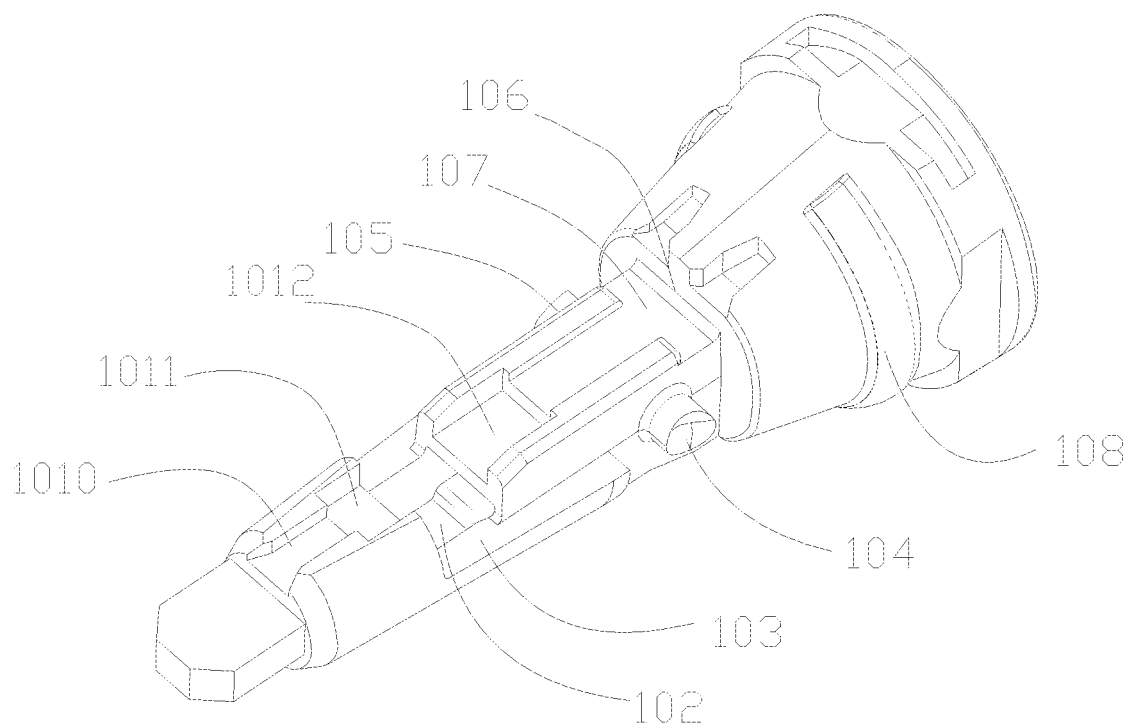
FIG. 4 is a schematic structural view of a connector body of the electric toothbrush connector of the present disclosure.
Figure 5:
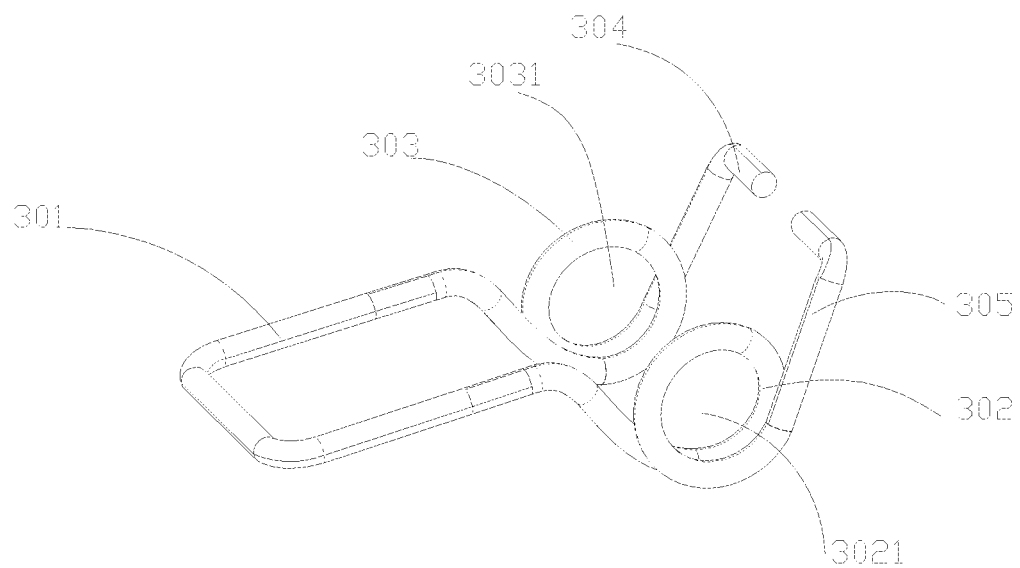
FIG. 5 is a schematic structural view of an elastic component of the present disclosure.
Figure 6:
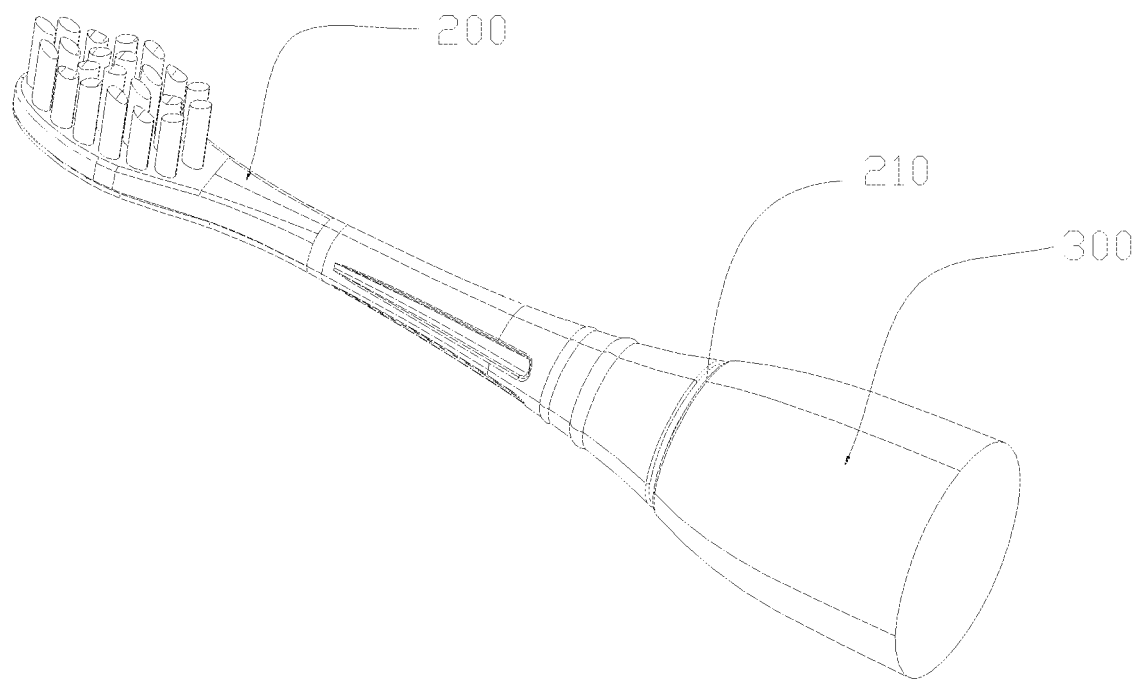
FIG. 6 is a schematic view of an overall structure of the electric toothbrush according to the present disclosure.
Figure 7:
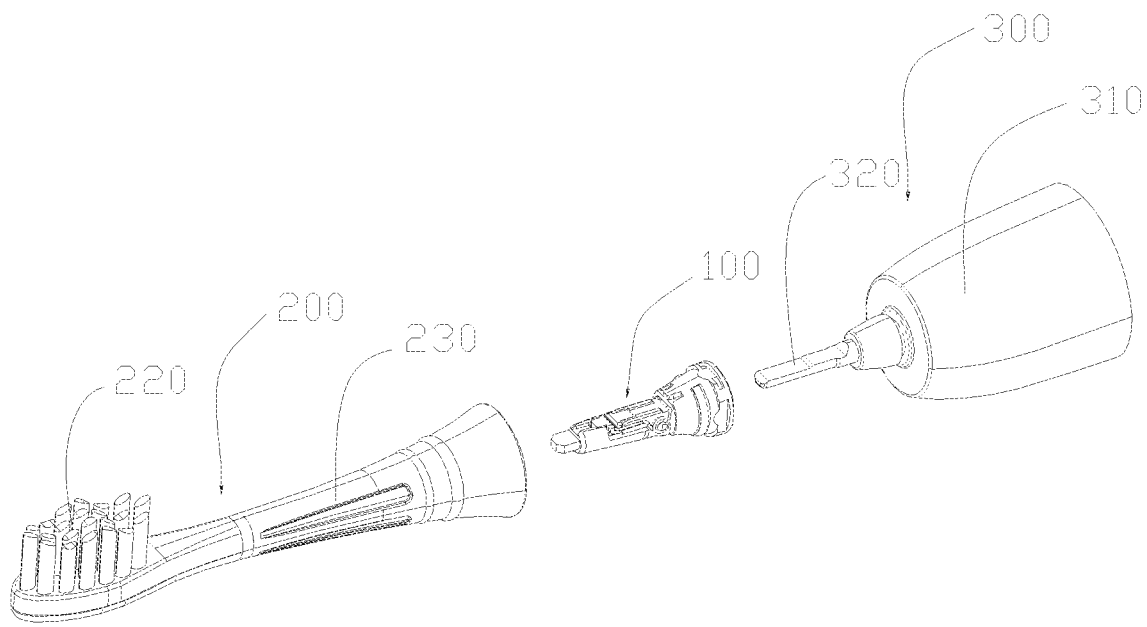
FIG. 7 is an explosion view of the electric toothbrush according to the present disclosure.
Figure 8:
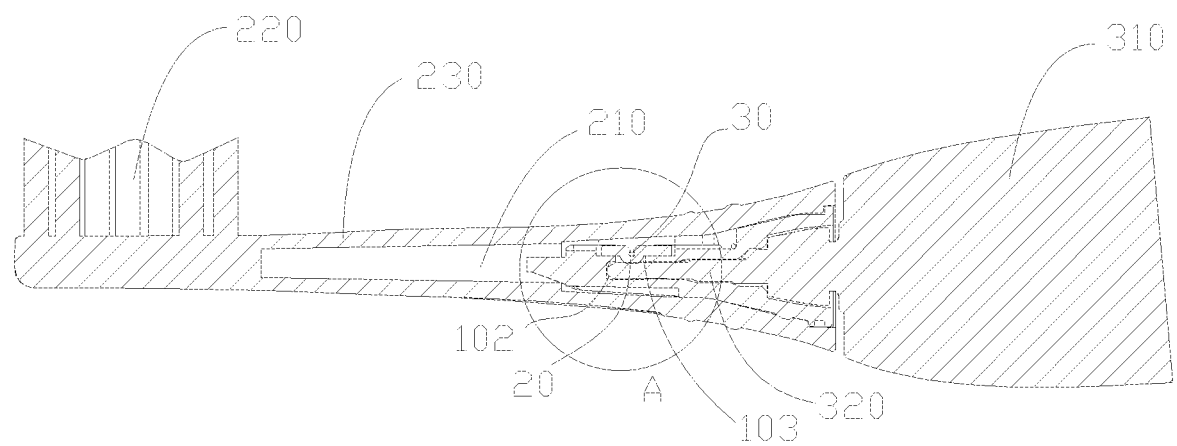
FIG. 8 is a cross-sectional view of the electric toothbrush of present disclosure.
Figure 9:
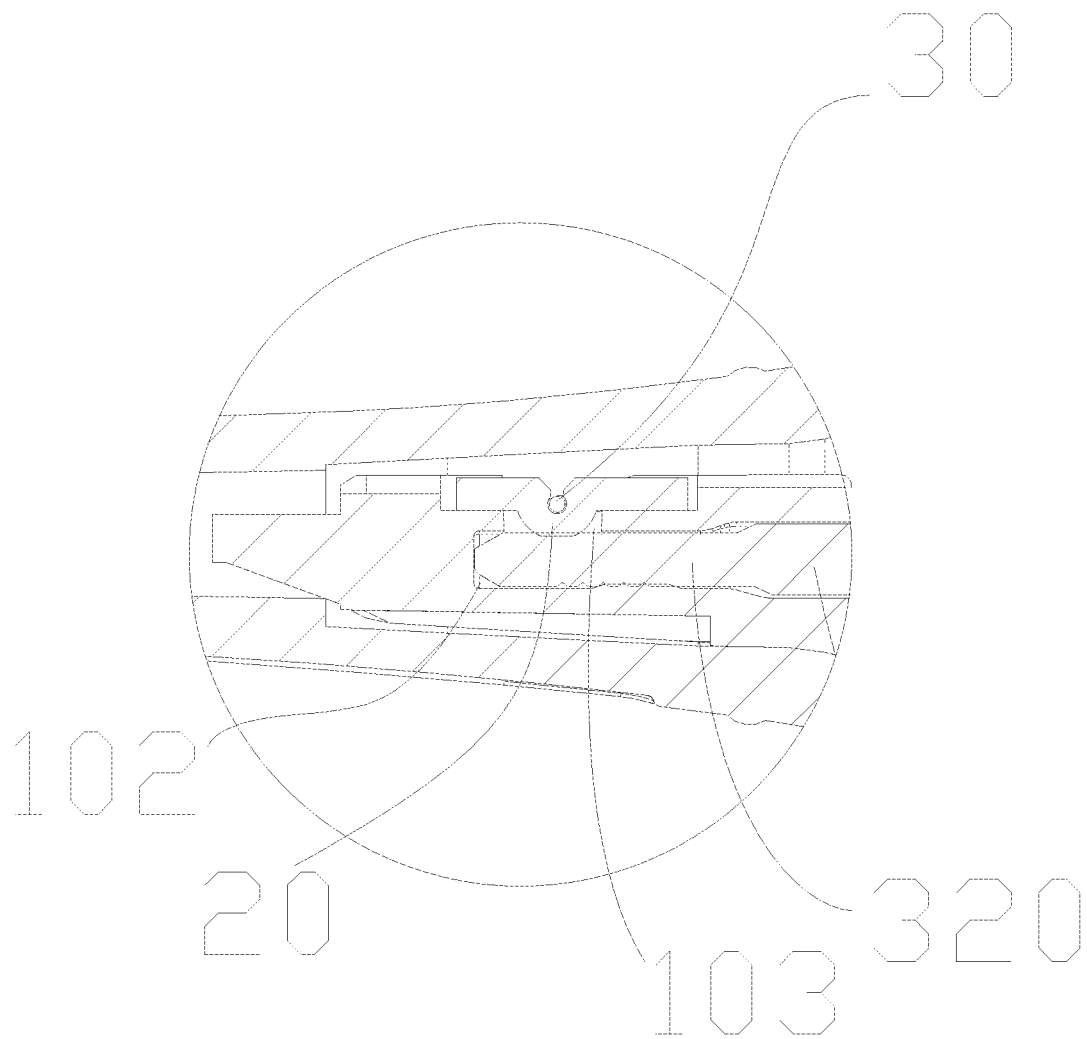
FIG. 9 is an enlarged view if a part A of FIG. 8.

Referring to FIG. 1 to FIG. 9, an electric toothbrush connector 100 includes a connector body 10, a pressing block groove 101 disposed in the connector body 10, a pressing module 20 located in the pressing block groove 101, an elastic member 30 connected to the connector body 10, and the pressing module 20 pressed against the pressing block groove 101.

According to above structure, under an elastic force of the elastic member, the pressing module 20 is squeezed into the pressing block groove 101. In a mating connection between the electric toothbrush connector 100 and the electric toothbrush, the pressing module 20 contacts and elastically compresses the electric toothbrush head, so that the connector body 10 cooperates more closely with a handle 300 of the electric toothbrush. By means of elastic adjustment and close force of the handle 300, mechanical vibration energy of the electric toothbrush head is effectively transmitted to the toothbrush head and noise is reduced. The elastic member 30 and the pressing module 20 may further reduce a case in which the electric toothbrush generates high-frequency vibration for a long time, thereby causing wear and wear of the connecting member and the handle. Therefore, it is more conducive to improve a life of the electric toothbrush.

In this embodiment, a first cavity 102 is disposed in the connector body 10, a first through hole 103 is disposed in the pressing block groove 101, the first through hole 103 is connected to the first cavity 102, and the first through hole 103 separates the pressing block groove 101 into a first limiting groove 1011 and a second limiting groove 1012. The pressing module 20 includes a first supporting block 201, a second supporting block 202, and a pressing block 203. The elastic member 30 presses the first supporting block 201 against the first limiting groove 1011 and the second supporting block 202 against the second limiting groove 1012, so that the pressing block 203 is located in the first through hole 103.

In above structure, because the first through hole 103 is connected to the first cavity 102, when the electric head in the electric toothbrush penetrates into the first cavity 102, the electric head can come into contact with the pressing module 20, so that the pressing module 20 and the electric head 320 are elastically extruded, the connector body 10 and the handle 300 cooperate more closely, thereby effectively implementing transmission of mechanical vibration energy of the electric head.

In this embodiment, the elastic member 30 is a torsion spring, and the elastic member 30 includes a U-shaped sleeve rod 301, a first helical spring 302 and a second helical spring 303 that are respectively connected to two ends of the U-shaped sleeve rod 301, and a first top rod 304 and a second top rod 305 that are respectively connected to the first helical spring 302 and the second helical spring 303. The first helical spring 302 is provided with a first tube hole 3021, and the second helical spring 303 is provided with a second tube hole 3031.

Further, the pressing block 203 is provided with a second through hole 2031, the U-shaped sleeve rod 301 may be clamped to the second through hole 2031, and is disposed in the pressing block 203. A first protrusion 104 is disposed on an outer side wall of the connector body 10, a second protrusion 105 is disposed on another outer side wall of the connector body 10 opposite to the first protrusion 104, a limiting wall 106 and a limiting groove 107 are further disposed on the connector body 10, the first tube hole 3021 is disposed in the first protrusion 104, the second tube hole 3031 is disposed in the second protrusion 105, and is disposed under torsion spring force. The first rod 304 and the second top rod 305 are fastened to the limiting wall 106 and the limiting groove 107, and the U-shaped sleeve rod 301 compresses the pressing module 20 into the pressing block groove 101. Both the first protrusion 104 and the second protrusion 105 are cylindrical protrusions. By using above structure, it is effectively implemented that the elastic member 30 compresses the pressing module 20 to the pressing block groove 101. This structure is skillfully and simply designed, and by using an elastic torsion of a torsion spring, the connector body 10 of the elastic member 30 cooperates with the handle 300 more closely.

In this embodiment, the connector body 10 further includes an annular buckle 108, and a portion of the annular buckle 108 is disposed on an outer wall at a bottom of the connector body (10). Specifically, in this embodiment, the annular buckle 108 is disposed in a semi-circular structure, and the annular buckle 108 is engaged with a slot on an inner wall of the toothbrush rod 230, which helps further fasten the electric toothbrush connector and the toothbrush head.

In this embodiment, the connector body 10 further includes a guiding rib 109, and the guiding rib 109 is disposed on an outer wall that is opposite to the pressing block groove 101 and is connected to the annular buckle 108. According to above structure, the guiding rib 109 and the slot on the inner wall of the toothbrush rod 230 are engaged with each other, which helps further fasten the electric toothbrush connector to the toothbrush head, and prevents the electric toothbrush connector from slipping out of the toothbrush rod 230 due to force rotation of the handle 300.

In this embodiment, a guiding groove 1010 is disposed in a recess on an outer wall at a top of the connector body 10, and the guiding groove 1010 is connected to the pressing block groove 101 and the limiting groove 107. According to above structure, the guiding groove 1010 makes it easy for the user to find a correct angle to install the electric toothbrush connector into the toothbrush head, thereby improving convenience used by the user.

In this embodiment, the diameter of the connector body 10 from the top to the bottom gradually increases. This design is conducive to adapting to the construction of the electric toothbrush, can provide better grip and handle, and can also increase stability and balance of the electric toothbrush.

Referring to FIG. 1 to FIG. 9, this embodiment further provides an electric toothbrush, including a toothbrush head 200. An electric toothbrush connection 100, where the electric toothbrush connection 100 includes a connection member body 10, a pressing module 20, and an elastic member 30, the connection member body 10 is provided with a pressing block groove 101, the pressing module 20 is located in the pressing block groove 101, the elastic member 30 is connected to the connector body 10, and the pressing module 20 is pressed against the pressing block groove 101. The handle 300 includes a handle body 310 and an electric head 320. The electric toothbrush connector 100 is configured to connect the toothbrush head 200 to the handle 300, the toothbrush head 200 is disposed on the electric toothbrush connector 100, and the electric head 320 is disposed inside the electric toothbrush connector 100. According to above structure, the elastic member 30 exerts an antitorsional force on the elastic member 30 to enhance the elastic adjustment of the pressing module 20 and the tight force of the handle 300, so as to effectively transfer the mechanical vibration energy of the driving handle to the toothbrush head 200 and reduce noise. The elastic member 30 and the pressing module 20 may further reduce a case in which the connector body and the handle are worn because high-frequency vibration is generated by using the electric toothbrush for a long time, thereby improving a service life and cleaning effect of the electric toothbrush.

In this embodiment, a first cavity 102 is disposed in the connector body 10, a first through hole 103 is disposed in the pressing block groove 101, the first through hole 103 is connected to the first cavity 102, and the first through hole 103 separates the pressing block groove 101 into a first limiting groove 1011 and a second limiting groove 1012. The pressing module 20 includes a first supporting block 201, a second supporting block 202, and a pressing block 203. The elastic member 30 presses the first supporting block 201 against the first limiting groove 1011 and the second supporting block 202 against the second limiting groove 1012, so that the pressing block 203 is located in the first through hole 103. In above structure, because the first through hole 103 is connected to the first cavity 102, when the electric head in the electric toothbrush penetrates into the first cavity 102, the electric head can come into contact with the pressing module 20, so that the pressing module 20 and the electric head 320 are elastically extruded, so that the connector body 10 of the connector body 10 and the handle 300 cooperate more closely, thereby effectively implementing transmission of mechanical vibration energy of the electric head.

In this embodiment, when the electric head 320 is penetrated into the electric toothbrush connector 100, the electric head 320 is located in the first cavity 102. Because the first through hole 103 is connected to the first cavity 102 and the pressing block 203 is located in the first through hole 103, the pressing block 203 contacts the electric head 320 under an elastic force of the elastic member 30 and compresses each other. According to above structure, under an elastic force of the elastic member, the pressing module 20 is squeezed into the pressing block groove 101. In a mating connection between the electric toothbrush connector 100 and the electric toothbrush, because the first through hole 103 is connected to the first cavity 102, the pressing module 20 contacts the electric head of the electric toothbrush and, under an elastic force, mutually compresses the pressing module 20, so that the connector body 10 cooperates more closely with the handle 300 of the electric toothbrush. By adjusting a tight force between the elastic member 30 and the handle 300, vibration energy of the electric toothbrush head is effectively transmitted to the head of the toothbrush and noise is reduced. The elastic member 30 and the pressing module 20 may further reduce wear of the connector and the handle caused by using the electric toothbrush for a long time, thereby improving a service life of the electric toothbrush.

In this embodiment, the elastic member 30 is a torsion spring, and the elastic member 30 includes a U-shaped sleeve rod 301, a first helical spring 302 and a second helical spring 303 that are respectively connected to two ends of the U-shaped sleeve rod 301, and a first top rod 304 and a second top rod 305 that are respectively connected to the first helical spring 302 and the second helical spring 303. The first helical spring 302 is provided with a first tube hole 3021, and the second helical spring 303 is provided with a second tube hole 3031.

Further, the pressing block 203 is provided with a second through hole 2031, the U-shaped sleeve 301 may be clamped to the second through hole 2031, and is disposed in the pressing block 203. A first protrusion 104 is disposed on an outer side wall of the connector body 10, a second protrusion 105 is disposed on another outer side wall opposite to the first protrusion 104, a limiting wall 106 and a limiting groove 107 are further disposed in the connector body 10, a first tube hole 3021 is disposed in the first protrusion 104, and a second tube hole 3031 is disposed in the second protrusion 105. Under a torsion spring force, the first top rod 304 and the second top rod 305 are fastened to the limiting wall 106 and the limiting groove 107, and the U-shaped sleeve rod 301 compresses the pressing module 20 into the pressing block groove 101. By using above structure, it is effectively implemented that the elastic member 30 compresses the pressing module 20 to the pressing block groove 101. This structure is skillfully and simply designed, and by using an elastic torsion of a torsion spring, the connector body 10 of the elastic member 30 cooperates with the handle 300 more closely.

In this embodiment, the connector body 10 further includes an annular buckle 108, and a part of the annular buckle 108 is disposed on an outer wall at a bottom of the connector body 10. Specifically, in this embodiment, the annular buckle 108 is disposed in a semi-circular structure, and the annular buckle 108 is engaged with a slot on an inner wall of the toothbrush rod 230, which helps further fasten the electric toothbrush connector and the toothbrush head.

In this embodiment, the connector body 10 further includes a guiding rib 109, and the guiding rib 109 is disposed on an outer wall that is opposite to the pressing block groove 101 and is connected to the annular buckle 108. According to above structure, the guiding rib 109 and the slot on the inner wall of the toothbrush rod 230 are engaged with each other, which helps further fasten the electric toothbrush connector to the toothbrush head, and prevents the electric toothbrush connector from slipping out of the toothbrush rod 230 due to force rotation of the handle 300.

In this embodiment, a guiding groove 1010 is disposed in a recess on an outer wall at a top of the connector body 10, and the guiding groove 1010 is connected to the pressing block groove 101 and the limiting groove 107. According to above structure, the guiding groove 1010 makes it easy for the user to find a correct angle to install the electric toothbrush connector into the toothbrush head, thereby improving convenience used by the user.

In this embodiment, the toothbrush head 200 is provided with a second cavity 210 with one side opening, the electric toothbrush connector 100 and the electric head 320 are disposed in the second cavity 210, and the handle body 310 abuts against the first cavity 102 and the second cavity 210. Specifically, the connector body 10 is tightly assembled with the toothbrush head 200, and the handle 300 is tightly coordinated with the connector body 10. The toothbrush head 200 includes a head 220 and a toothbrush rod 230, and the head 220 is disposed on a head of the toothbrush rod 230. According to above structure, it can be prevented that the internal structure component of the electric toothbrush does not generate abnormal sound due to the high-frequency vibration of the drive handle in the operating state, so that in the operating state, the vibration drive is more smooth and the noise is more gentle, so that the high-frequency vibration of the head 220 is more effective, and force is used to achieve the best experience effect of cleaning the teeth.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:
1. An electric toothbrush connector (100), comprising:
   a connector body (10), wherein a pressing block groove (101) is disposed in the connector body (10);

a pressing module (20), wherein the pressing module (20) is located in the pressing block groove (101);

an elastic member (30), wherein the elastic member (30) is connected to the connector body (10), and the pressing module (20) is pressed against the pressing block groove (101);

wherein the elastic member (30) is a torsion spring, the elastic member (30) comprises a U-shaped sleeve rod (301), a first coil spring (302) and a second coil spring (303) respectively connected to two ends of the U-shaped sleeve rod (301), and a first top rod (304) and a second top rod (305) respectively connected to the first coil spring (302) and the second coil spring (303), wherein the first coil spring (302) is provided with a first tube hole (3021), and the second coil spring (303) is provided with a second tube hole (3031).

2. The electric toothbrush connector (100) according to claim 1, wherein the connector body (10) is provided with a first cavity (102), a first through hole (103) is provided on the pressing block groove (101), the first through hole (103) is communicated with the first cavity (102), and the first through hole (103) separates the pressing block groove (101) into a first limit groove (1011) and a second limit groove (1012).

3. The electric toothbrush connector (100) according to claim 2, wherein the pressing module (20) comprises a first supporting block (201), a second supporting block (202), and a pressing block (203), and the elastic member (30) presses the first supporting block (201) against the first limiting slot (1011) and the second supporting block (202) against the second limiting slot (1012) such that the pressing block (203) is located in the first through hole (103).

4. The electric toothbrush connector (100) according to claim 3, wherein the pressing block (203) is provided with a second through hole (2031), the U-shaped sleeve rod (301) is clamped into the second through hole (2031) and disposed in the pressing block (203), one outer side wall of the connector body (10) is provided with a first protrusion (104), the connector body (10) is provided with a second protrusion (105) on an outer side of a side wall opposite to the first protrusion (104), the connector body (10) is further provided with a limiting wall (106) and a limiting groove (107), the first tube rod (3021) is disposed in the first protrusion (104), the second tube rod (3031) is disposed in the second protrusion (105), and a second spring is disposed in the second protrusion (105), and the connector body (106) is located in the limiting wall (107) and the limiting groove (107), under the controls of a torsion spring force, a first jacking rod (304) and a second jacking rod (305) are pressed against the limit wall (106) and the limit groove (107), and the U-shaped sleeve rod (301) presses the pressing module (20) in the pressing block groove (101).

5. The electric toothbrush connector (100) of claim 4, wherein both the first protrusion (104) and the second protrusion (105) are cylindrical protrusions.

6. The electric toothbrush connector (100) according to claim 1, wherein the connector body (10) further comprises an annular buckle (108), and a portion of the annular buckle (108) is disposed on an outer wall at a bottom of the connector body (10).

7. The electric toothbrush connector (100) according to claim 6, wherein the connector body (10) further comprises a guiding rib (109) protruding out of the outer wall of the pressing block groove (101) and is connected to the annular buckle (108).

8. The electric toothbrush connector (100) according to claim 3, wherein a guiding groove (1010) is provided on an outer wall of a top of the connector body (10), and the guiding groove (1010) is in communication with the pressing block groove (101) and the limit groove (107).

9. An electric toothbrush, comprising:
a toothbrush head (200);
an electric toothbrush connector (100), wherein the electric toothbrush connector (100) comprises a connector body (10), a pressing module (20), and an elastic member (30), the connector body (10) is provided with a pressing block groove (101), the pressing module (20) is located in the pressing block groove (101), the elastic member (30) is connected to the connector body (10), and the pressing module (20) is pressed against the pressing block groove (101);

a handle (300), wherein the handle (300) comprises a handle body (310) and an electric head (320), the electric toothbrush connector (100) is configured to connect the toothbrush head (200) to the handle (300), the toothbrush head (200) is disposed on the electric toothbrush connector (100), and the electric head (320) is disposed inside the electric toothbrush connector (100);

wherein the elastic member (30) is a torsion spring, the elastic member (30) comprises a U-shaped sleeve rod (301), a first coil spring (302) and a second coil spring (303) respectively connected to two ends of the U-shaped sleeve rod (301), and a first top rod (304) and a second top rod (305) are respectively connected to the first coil spring (302) and the second coil spring (303), the first coil spring (302) is provided with a first tube hole (3021), and the second coil spring (303) is provided with a second tube hole (3031).

10. The electric toothbrush of claim 9, wherein the connector body (10) is provided with a first cavity (102), a first through hole (103) is provided on the pressing block groove (101), the first through hole (103) is communicated with the first cavity (102), and the first through hole (103) separates the pressing block groove (101) into a first limit groove (1011) and a second limit groove (1012).

11. The electric toothbrush according to claim 10, wherein the pressing module (20) comprises a first supporting block (201), a second supporting block (202), and a pressing block (203), and the elastic member (30) presses the first supporting block (201) against the first limiting slot (1011) and the second supporting block (202) against the second limiting slot (1012) such that the pressing block (203) is located in the first through hole (103).

12. The electric toothbrush according to claim 11, wherein when the electric head (320) penetrates inside the electric toothbrush connector (100), the electric head (320) is located within the first cavity (102), because the first through hole (103) is in communication with the first cavity (102), and the pressing block (203) is located within the first through hole (103), the pressing block (203) is in contact with the electric head (320) under an elastic force of the elastic member (30) and the pressing block (203) and the electric head (320) compresses each other.

13. The electric toothbrush according to claim 12, wherein the pressing block (203) is provided with a second through hole (2031), the U-shaped sleeve (301) is configured to be clamped into the second through hole (2031) and disposed in the pressing block (203), one outer side wall of the connector body (10) is provided with a first protrusion (104), the connector body (10) is provided with a second protrusion (105), the connector body (10) is further provided with a limiting wall (106) and a limiting slot (107), a first tube hole (3021) is provided in the first protrusion (104), and the second tube hole (3031) is provided in the second protrusion (105); under the controls of a torsion spring force, a first jacking rod (304) and a second jacking rod (305) are pressed against the limit wall (106) and the limit groove (107), and the U-shaped sleeve rod (301) presses the pressing module (20) in the pressing block groove (101).

14. The electric toothbrush according to claim 9, wherein the connector body (10) further comprises an annular buckle (108), and a portion of the annular buckle (108) is disposed on an outer wall at a bottom of the connector body (10).

15. The electric toothbrush according to claim 14, wherein the connector body (10) further comprises a guiding rib (109) protruding out of the outer wall of the pressing block groove (101) and is connected to the annular buckle (108).

16. The electric toothbrush of claim 15, wherein a guiding groove (1010) is provided on an outer wall of the top of the connector body (10), and the guiding groove (1010) is in communication with the pressing groove (101) and the limit groove (107).

17. The electric toothbrush according to claim 10, wherein the toothbrush head (200) is provided with a second cavity (210) having an opening, the electric toothbrush connector (100) and the electric head (320) are disposed within the second cavity (210), and the handle body (310) abuts against the first cavity (102) and the opening of the second cavity (210).

18. The electric toothbrush according to claim 9, wherein the toothbrush head (200) comprises a head (220) and a toothbrush rod (230) disposed on a head of the toothbrush rod (230).

\* \* \* \* \*